H. W. LIGON.
APPARATUS FOR HANDLING COTTON AND THE LIKE.
APPLICATION FILED MAR. 29, 1915. RENEWED NOV. 4, 1918.

1,340,964.

Patented May 25, 1920.
6 SHEETS—SHEET 1.

H. W. LIGON.
APPARATUS FOR HANDLING COTTON AND THE LIKE.
APPLICATION FILED MAR. 29, 1915. RENEWED NOV. 4, 1918.

1,340,964.

Patented May 25, 1920.
6 SHEETS—SHEET 6.

UNITED STATES PATENT OFFICE.

HARRY W. LIGON, OF ATLANTA, GEORGIA, ASSIGNOR TO CONTINENTAL GIN COMPANY, OF BIRMINGHAM, ALABAMA, A CORPORATION OF DELAWARE.

APPARATUS FOR HANDLING COTTON AND THE LIKE.

1,340,964.  Specification of Letters Patent.  Patented May 25, 1920.

Application filed March 29, 1915, Serial No. 17,814. Renewed November 4, 1918. Serial No. 261,170.

*To all whom it may concern:*

Be it known that I, HARRY W. LIGON, a citizen of the United States, residing at Atlanta, in the county of Fulton and State of Georgia, have invented certain new and useful Improvements in Apparatus for Handling Cotton and the like; and I do hereby declare the following to be a full, clear, and exact description of the same, reference being had to the accompanying drawings, forming part of this specification, and to the figures and letters of reference marked thereon.

This invention relates to improvements in apparatus for handling cotton and other raw fibers preparatory to compressing the fibers into bales for shipment.

The present invention is directed to an improved arrangement for handling the cotton and feeding it to the tramper press, in combination with an automatic tramper instantaneously responsive to the accumulation of a proper amount of cotton in the press box beneath the tramper head. An improved mechanism is provided for automatically and positively stopping the feed of cotton when the lowering tramping stroke of the tramper head commences, and also preventing further feed during the downward tramping stroke of the tramper head and until the tramper head has returned to its former elevated position. The novel mechanism is also responsive to a return of the tramper head, in a manner that, as soon as the normal elevated position of the tramper head is resumed, feed of the cotton to the press box instantly recommences, and the feeding proceeds until a sufficient quantity has accumulated in the press box, to again start the tramper head on its downward tramping stroke. The improved control of the tramper and cotton feed utilizes those parts of the machinery most sensitive to the pressure exerted by the cotton.

The invention also provides an automatic tripping device which, when a sufficient quantity of cotton has accumulated in the press box to actuate the tramper head, maintains the parts controlling the supply of power to the tramper head in operative relation, and also positively prevents renewed activity of the cotton feeding device until the tramper head resumes its normal elevated position. The automatic tripping device will be directly controlled by the movements of the tramper head, and consequently a proper relation of tramping and feed is always maintained. In operation, the improved tripping device locks the parts in such relation that a supply of power to the tramper head is continued, during its downward compression stroke, and, when the supply is reversed during the upward stroke of the tramper head the parts are also locked to continuously supply power acting upwardly on the tramper head. At the same time, the several instrumentalities are reset in a manner that cotton feed immediately recommences, when the tramper head has arrived at its normal elevated position.

Furthermore, a novel construction of feeding element is provided. This feeding element is so arranged that it exerts its control over the cotton, even after the cotton has passed the limits of the discharge chute, and thus a much more even distribution of the cotton within the press box is attained. One arrangement of feed provided by the present invention insures an equal distribution of cotton in the direction of feed, that is, longitudinally of the discharge chute. In addition, the feeding element also has the property of acting as a screen or barrier against discharge of cotton into the press box, during lowering movement of the tramper head, a further advantage since it dispenses with separate arrangements for effecting this result.

The invention also provides an improved mechanism for weighing the amount of cotton as it is tramped down into the press box. Utilization of the amount of pressure required to tramp the cotton is made to determine the weight of the cotton tramped. The scope of the tramper is thus greatly enlarged, and the size of the bales may be regulated with a degree of exactness heretofore not possible.

In addition to the improved constructions, combinations, and mechanisms above outlined, the invention also consists in other improvements in the apparatus, including a general superiority of organization of the parts, and a much more efficient degree of operation.

A full understanding of the invention will be attained from the following detail description of a preferred arrangement of parts and combinations of parts, when taken in connection with the accompanying drawings.

In the drawings,—

Fig. 3 is a detail side elevation of one member of the improved feeding means.

Fig. 4 is a plan view of the feeding means illustrated in Fig. 3.

Fig. $4^a$ is a transverse section taken on a plane indicated by the line $4^a$—$4^a$ of Fig. 4.

Fig. 8 is an end elevation of the automatic tramper and certain of the other parts looking in the direction of the arrows from a plane indicated by the line 8—8, of Fig. 2.

Fig. 11 is a detail view of a modified form of controlling valve mechanism.

Fig. $11^a$ is an enlarged detail view of the arrangement shown in Fig. 11.

Fig. 12 is a detail view of a further modified form of controlling valve mechanism.

Fig. 13 is a detail view of an improved arrangement for determining the weight of the cotton tramped in the press box, and also for notifying the operator when a proper amount of cotton for baling is tramped in the press box.

Fig. $13^a$ is a plan of a preferred form of weighing device.

Fig. $13^b$ is a section on the line $13^b$—$13^b$ of Fig. $13^a$.

Figures 3, 4, 4A, 8:
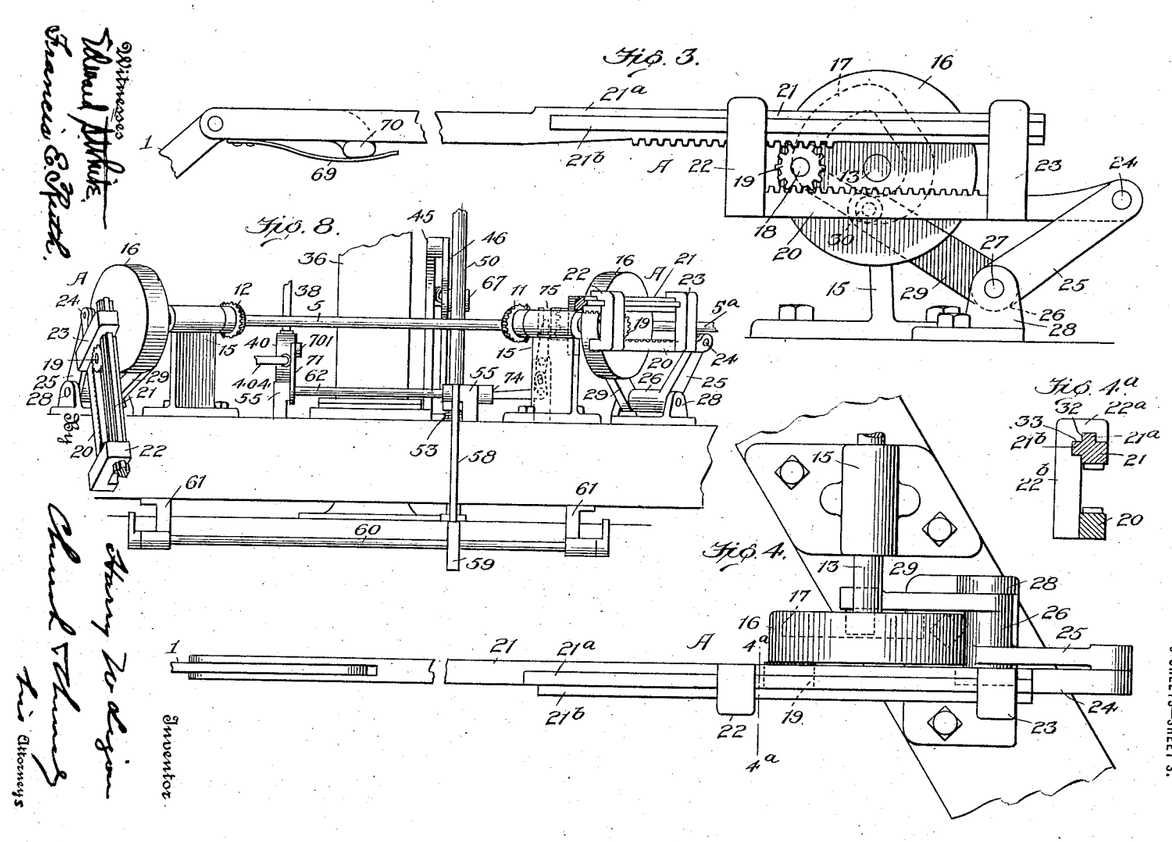
Figure 5:
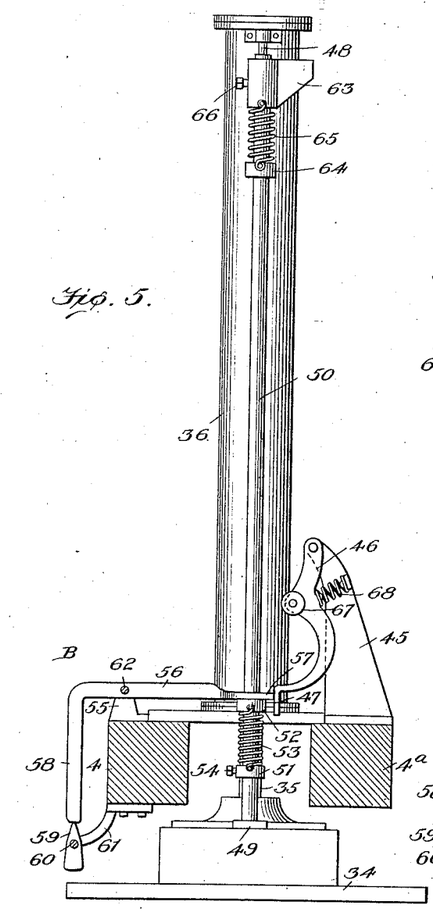
Fig. 5 is a detail side elevation of the automatic tripping device showing the parts in the positions they assume during feed of the cotton into the press box.
Figure 6:
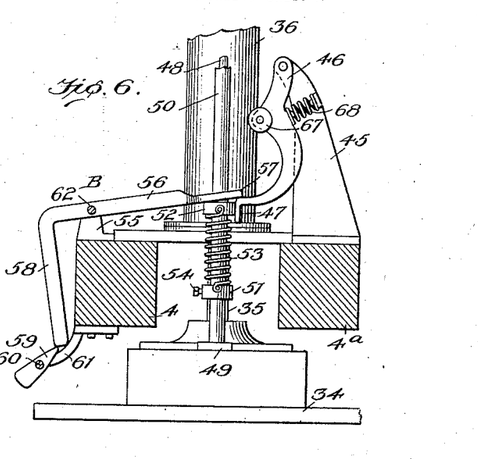
Fig. 6 is a view similar to Fig. 5, but showing the parts in the positions they assume when the tramper head is starting on its downward tramping stroke.

For convenience in description, the improved apparatus provided by the present invention is divided into four grand divisions, as follows:

A—the improved feeding mechanism shown more particularly in Figs. 3 and 4.

Figure 15:
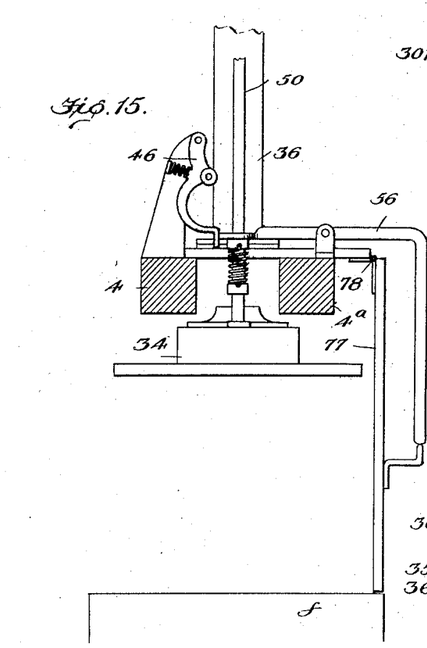
Fig. 15 is a detail side elevation of a modified form of automatic tripping device.

B—the automatic tripping device, which controls the feed of the cotton, and also the operation of the tramper press, illustrated more particularly in Figs. 5 to 8, inclusive, and a modification thereof in Fig. 15.

C—the improved controlling valve mechanism, and its modification shown more particularly in Figs. 9 to 12 inclusive.

Figures 13, 13A:
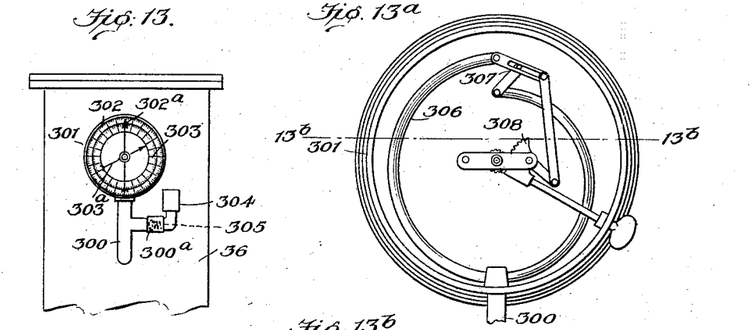
Figure 14:
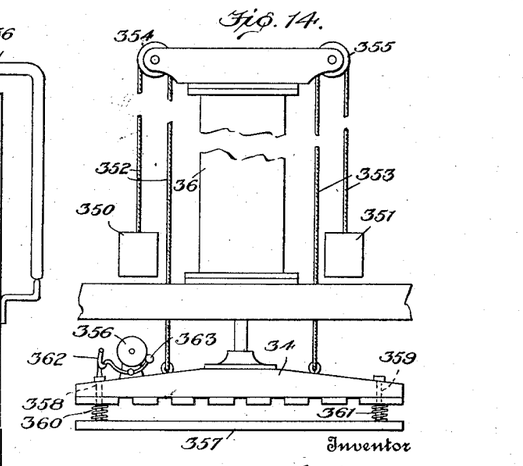
Fig. 14 is a detail view of a modified form of device for notifying the operator when a proper amount of cotton for baling is tramped in the press box, shown in connection with a different type of tramper press.

D—the improved arrangement for determining the weight of the cotton tramped in the press, and also for notifying the operator when a sufficient quantity has been tramped, illustrated in Fig. 13, and a modification in Fig. 14.

*General construction.*

Figures 1, 9:
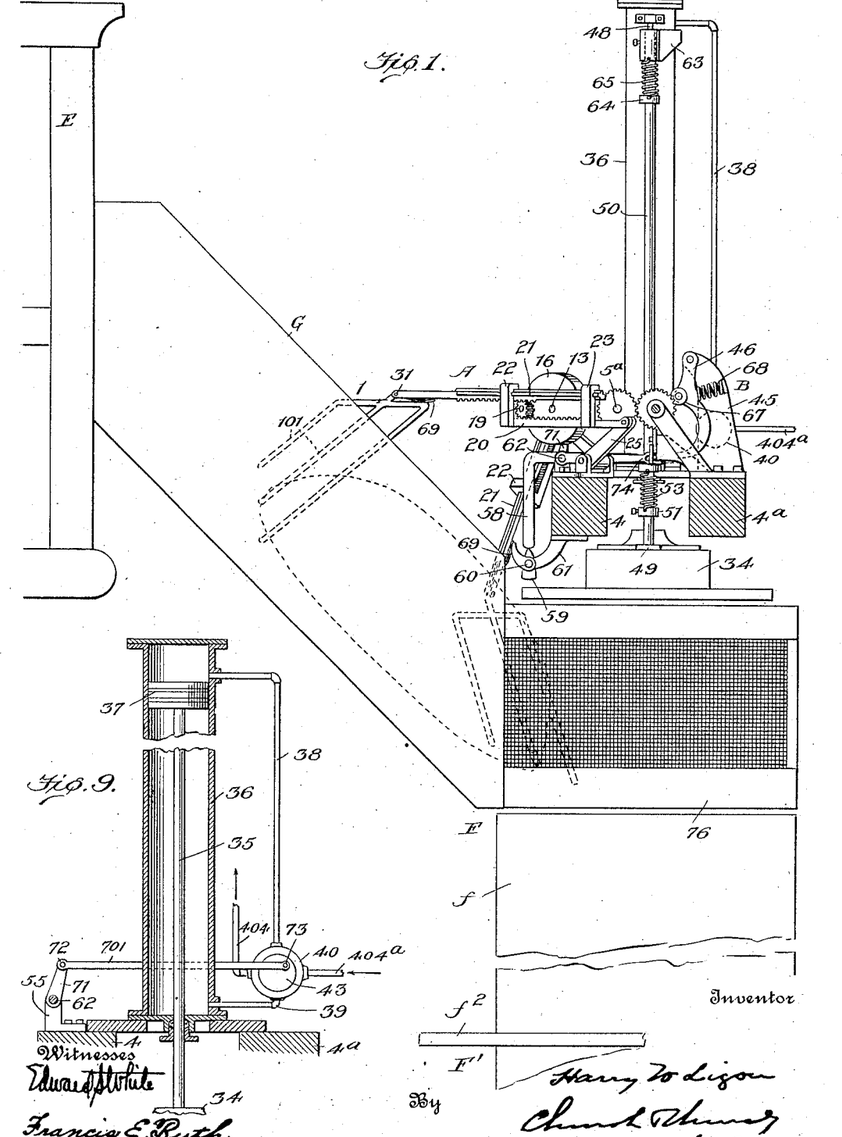
Figure 1 is a side elevation of a condenser, lint slide and automatic tramper constructed in accordance with the present invention.
Fig. 9 is a section through the tramper and power cylinder, taken on the line 9—9 of Fig. 2, with certain of the parts in elevation, and designed for the purpose of illustrating in detail the operation of an improved controlling valve mechanism.
Figure 2:
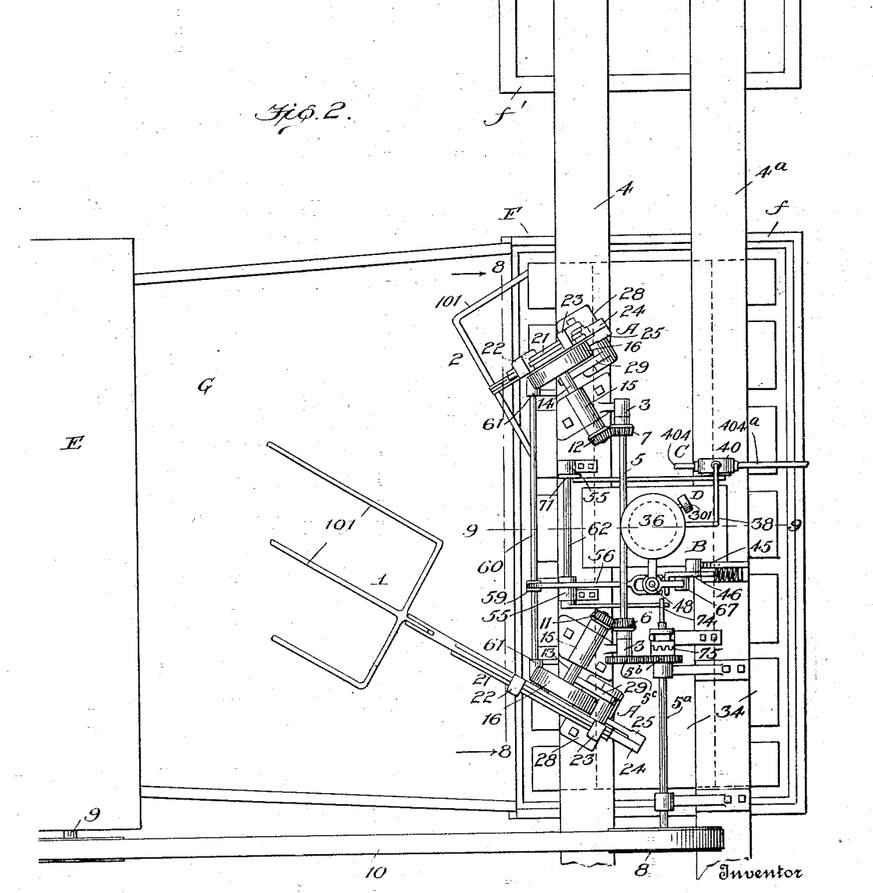
Fig. 2 is a plan view similar to Fig. 1.

The general construction of the improved apparatus will best be understood in Figs. 1 and 2. A condenser is indicated diagrammatically at E, and comprises the usual instrumentalities which convert the ginned cotton into a sheet or, as usually termed, batting. Located between and connecting the condenser E with the tramper press F is a lint slide or cotton chute G, which is preferably inclined in the direction of discharge so as to permit a gravital flow of the cotton toward the tramper press F. The tramper press F is shown as consisting of a pair of press boxes, $f$, $f'$, each mounted on a rotatable table $f^2$, so that when a press box has been filled with cotton through the cotton chute G, it may be swung around into position for baling the cotton by the baling mechanisms, not shown, but which may be of any preferred type, well known in the art, and simultaneously a press box from which a completed bale has been removed is swung around into position to receive cotton discharged by the cotton chute. Inasmuch as the general construction of the press boxes $f$, $f'$ and the baling mechanisms is well known in the art, a detailed description will not be given. The feeding mechanism A includes devices which grasp the cotton in the lint slide and positively feed it to a press box $f$. When a sufficient quantity of cotton has accumulated within the press box, the feeding mechanism A releases the automatic tripping device B which becomes instantly operative to actuate the controlling valve mechanism C in a manner to supply power to the tramper head and start it on its downward tramping stroke. At the same instant, the tripping device B immediately renders inoperative the feeding mechanism and stops feed of the cotton, this relation between tripping device and feeding mechanism continuing until the tramper head has made a complete tramping stroke and returned to its former elevated position. Upon return of the tramper head, the automatic tripping device B immediately sets the feeding mechanism in operation. In one form of the invention, the controlling valve C is entirely actuated by the tripping device, for supplying power to effect both lowering and upward movements of the tramper head. In another form of the invention, the controlling valve is opened to permit upward movement of the tramper head by the fluid pressure in the power cylinder. When by repeated operations of the tramper head and feeding mechanism, enough cotton has been tramped in a press box to constitute a sufficient quantity for baling, this will be indicated by the improved weighing arrangement D, or an automatic alarm, or both, as will be hereinafter explained.

*The feeding mechanism.*

The feeding mechanism A comprises instrumentalities which grasp the cotton in the lint slide G and positively feed it to a press box $f$ for instance. These instrumentalities preferably consist of a pair of independently mounted rakes 1, 2, each of which is provided with its own operating mechanism for advancing it toward the press box, and the rakes are so arranged and operated with respect to each other that they are alternately engageable with the cotton. Rotatably mounted in suitable brackets 3 upreaching from a transverse sill 4 forming part of the press frame (Figs. 1 and 2) is a transverse shaft 5, having fixed thereto bevel pinions 6, 7, repectively. Motion may be imparted to shaft 5 through a drive pulley 8 mounted at one end of a counter shaft $5^a$, which counter shaft is provided with a gear $5^b$ in mesh with a gear $5^c$ on shaft 5. The drive pulley may derive its power from the power shaft 9 of the condenser, by means of a pulley belt 10. Bevel pinions 6, 7 are in mesh with bevel pinions 11, 12, mounted on the ends of and for rotation with shafts 13, 14 journaled in suitable brackets and set at diverging angles with respect to transverse sill 4. These shafts 13, 14 are the power shafts for actuating the rakes 1, 2, through independent rake actuating mechanisms, and, for the reason that the rakes and their actuating mechanisms are identical in every particular, a description of rake 1 will suffice for both.

The details of construction of rake 1 and the mechanism for operating it can best be understood in Figs. 3 and 4. As shown therein, shaft 13 is journaled in suitable brackets 15 upreaching from the press frame, and has fixed thereto a cam disk 16. Cam disk 16 is provided on its inner face with a cam slot 17, and on its outer face with a fixed eccentrically mounted stud 18. Rotatably mounted on the said stud 18 is a pinion 19, which pinion is in mesh with the teeth of a lower rack bar 20, and also in mesh with the teeth of an upper rack bar 21, slidably mounted in upreaching supporting brackets 22, 23; carried by the lower rack bar. At its inner end $20^a$ lower rack bar 20 is pivotally secured to one arm 25 of a lever for constantly changing the center 24 about which rack bar 20 swings. Arm 25, at its other end, is provided with a sleeve-like portion 26 rockably mounted on stub shaft 27 fixed in a bracket 28. The sleeve-like portion 26 also bears an arm 29 projecting at an angle upwardly from stub shaft 27, and having at its free end a roller 30 which travels in cam slot 17. Accordingly, it will be understood that arm 29 forms the other arm of the lever, and that, when cam disk 16 is rotated, lever comprising arms 29, 25, is rocked on stub shaft 27, and center 24 is shifted to a degree corresponding with the throw of the cam, and at the same time, pinion 19 travels back and forth on the toothed surface of lower rack bar 20. The result of these movements is that upper rack bar 21 is reciprocated in brackets 22, 23, pinion 19 supplying the power, and simultaneously imparting an elliptical sweeping motion about a constantly changing center 24, in response to the oscillations of lower rack bar 20, (see dotted lines, Fig. 1). The rake 1, will be mounted on the end of rack bar 21, preferably by a pivot 31 (Fig. 1) and the motion of the cam and its connected parts will be so timed that rack bar 21, and rake 1 is withdrawn from contact with the cotton, during movement of the rake toward the condenser E.

In the operation of the above described arrangement, there will be imparted to the rake 1, a reciprocatory motion the limits of which are defined by the length of the toothed surface of connected rack bar 21, plus the sweeping movement imparted by the cam and its connections, which because of the constantly changing center 24, is much wider in cope than the thrust of the cam. In practice, the rake and its operating mechanism will preferably be so mounted that the feeding movement of the rake will not be limited by the discharge end of the chute G, adjacent the press box, but will extend beyond and beneath the tramper head. By permitting the rake to enter the space beneath the tramper head, the period during which the cotton bat is under the influence of the positive feed is considerably increased so that cotton will be fed equally to the far side of the press box opposite the discharge end of the lint slide. A great difficulty with all previous constructions of feeding devices has been a tendency to pile the cotton in a heavy mass in the near side of the press box adjacent the discharge end of the chute and consequently an over-accumulation on one side of the cotton box not only results in an uneven distribution of strain on the tramper head, but in the production of a one-sided bale. By increasing the period during which the cotton is under the influence of a positive feed, the tendency to uneven distribution within the press box is proportionately decreased and the bales produced in the press will be even-sided and uniform in appearance.

In Fig. 4$^a$ is illustrated a preferred method of mounting rack bar 21 in brackets 22, 23. Each bracket is provided with grooves 32, 33, groove 32 being in an overhanging horizontal portion 22$^a$ of a bracket 22, and groove 33 in the upreaching vertical portion 22$^b$. The rack bar 21 is provided with a vertically projecting longitudinally extending spline 21$^a$, and horizontally projecting, longitudinally extending spline 21$^b$. Splines 21$^a$, 21$^b$ slide in grooves 32, 33 respectively, and prevent vertical and lateral displacement of rack bar 21, during its reciprocatory movements in the brackets 22, 23.

In practice, the number of rakes with their independent operating mechanisms may be governed by the dimensions of the discharge chute G. The present embodiment of the invention employs two feeding rakes 1 and 2, and as previously described, these rakes will be operated from a common drive shaft 5, and their respective movements will be properly timed, so that the rakes will be alternately engageable with the cotton. In other words, while a rake 1, for instance, is progressing the cotton toward the press box, a rake 2 will be retracted from engagement with the cotton and in its return movement toward the beginning of the discharge chute G. The arrangement of the rakes provides a practically continuous feed of the cotton during the intervals, when the tramper press is inactive.

The reason for arranging the rakes on shafts disposed at an angle with respect to the press frame, is to permit an angular sweep of the rakes through the discharge chute from the condenser end to the press end, so that the feeding action of a rake on the cotton is in a path diverse from the normal gravital flow of the cotton in the discharge chute. In Fig. 2, it will be seen that rake 1 is movable from the upper right hand corner of chute G to the lower left hand corner thereof, and rake 2 is movable from the upper left hand corner of said chute to its lower right hand corner. It frequently occurs that the cotton batting, as discharged by the condenser, is more bulky on one side than on the other, and, accordingly the diverse sweep of the respective rakes will draw portions of cotton away from the more bulky side of the batting and distribute it to the less bulky side. In this manner an even distribution of the cotton longitudinally of the chute, and in the direction of feed or discharge is effected. For the purpose of increasing the effective scope of a rake (1 for instance) the prongs 101 thereof are progressively greater in length, in such manner that a line coinciding with the ends of the prongs would be in a plane parallel with the end wall of the condenser.

The automatic tripping device.

The automatic tripping device which controls the cotton feed, also the operation of the tramper press, is illustrated in detail in Figs. 5 to 8, inclusive.

This tripping device includes a novel construction for automatically setting the tramper press in operation when a sufficient quantity of cotton has accumulated in the press box. In the preferred form, the automatic mechanism for doing this is controlled by direct pressure of the cotton within the press box on the cotton-engaging feeding element or rake. This permits a utilization of the most sensitive part in the entire apparatus for the control of the tramper press and presents the important advantage that operation of the tramper press is directly responsive to the feed of the cotton, and hence becomes operative with a greater degree of positiveness when a sufficient quantity of cotton has accumulated. The tramper press F illustrated in the accompanying drawings is of the fluid pressure actuated type and includes a pair of interchangeable press boxes $f$, $f'$, one $f$ of which is in position beneath the tramper head 34 and the other $f'$ is in position for baling the cotton previously tramped by repeated lowering movements of tramper head 34. As previously stated, the two press boxes are generally mounted on a rotatable table or support $f^2$ in such manner that by turning the table half a revolution, a box filled with cotton can be shifted to position for baling and at the same time the emptied box will be shifted into position beneath the tramper head. Inasmuch as the present invention is not concerned with the treatment of the cotton after a sufficient quantity has been tramped in a press box, the further steps which result in the production of a bale will not be described. The tramper head 34 is mounted on the lower end of a piston rod 35 which piston rod extends through a pressure cylinder 36 and is provided at its upper end with a head 37. A fluid pressure supply pipe 38 enters the cylinder 36 near the top thereof, and is adapted to supply fluid pressure for effecting lowering movement of the piston and tramper head; a second fluid pressure supply pipe 39 enters the cylinder near the lower end thereof and supplies fluid pressure to return the piston head and its connected piston rod and tramper head to their former elevated position after the cotton has been tramped. The power supplied to pipes 38 and 39 may be either steam, compressed air or hydraulic power and as a matter of fact the type herein shown is equally adapted for use with any form of fluid pressure. For convenience it will be assumed that steam is employed as the motive fluid. Both pipes 38, 39 lead to a controlling valve 40. This controlling valve may be of any convenient type, for instance, a rotary valve having a port 41 in communication with supply pipe 38 and port 42 in communication with supply pipe 39. A ported valve body 43 is rotatably mounted within the valve and is so arranged that when fluid pressure is being supplied through port 41, port 42 and supply pipe 39 will be in communication with an exhaust port 44 leading to the atmosphere. When the valve body 43 is shifted so that port 42 is in communication with the interior of the valve body and also with supply pipe 39 to supply fluid pressure to the lower end of the power cylinder, the pressure from a previous lowering stroke of the piston in the cylinder and above piston head 37 is exhausted through supply pipe 38 port 41 and exhaust port 44 to the atmosphere. The controlling valve is adapted to be actuated to effect lowering movement of the tramper head or plunger by the direct pressure of the cotton itself on the feeding element through the following instrumentalities:

Mounted on a transverse sill $4^a$ is an upreaching bracket 45. A trip lever 46 is pivoted at one of its ends to the upper end of said bracket and at its free end is provided with a suitable catch or trip 47. Extending lengthwise of the power cylinder 39 and preferably approximate thereto is a fixed rod 48 rigidly secured to the press frame. Secured to the tramper head, for instance, by an end plate 49, is a hollow rod or elongated sleeve 50, embracing the fixed rod 48, and movable thereon in response to up and down movements of the tramper head. Adjacent to the lower end of said hollow rod 50 and adjustably fixed thereto is a collar 51, and in spaced relation above the collar 51 is a second collar 52. Collar 52, however, is capable of movement longitudinally on shaft 50 and is secured to the upper end of a coil spring 53, encircling the rod between the two collars and having its lower end secured to the fixed collar. It will be noted that adjustment of sliding collar 52 and spring 53 on the rod may be effected through fixed collar 51 and this by providing collar 51 with a thumb screw 54 or other device whereby it may be shifted along rod 50 and securely locked in adjusted position. Pivotally mounted on a fixed bracket 55 upreaching from sill 4 adjacent the lint slide is an operating lever 56 in the form of a bell crank, the horizontal arm of which is provided with a forked end 57 embracing hollow rod 50 and the depending vertical arm 58 is normally in engagement with a trip 59 mounted on a rock shaft 60 journaled in brackets 61 depending from the lower end of sill 4. The pivotal point of bell crank lever 56 is a transverse shaft 62 mounted in suitable brackets on said sill 4 and adapted to rock in response to oscillations of the bell crank lever. The transverse shaft 62 is the medium through which the controlling valve is operated to effect lowering movement of the tramper head or plunger and also the medium for stopping the feed of the cotton when the plunger starts on its downward tramping stroke, as will be hereinafter more fully explained. Adjacent the extreme upper end of hollow rod 50 is a cam 63, and interposed between said cam 63 and a spaced slidable collar 64 is a coil spring 65 encircling rod 50. The ends of coil spring 65 are secured to cam 63, and slidable collar 64 respectively. Adjustment of said cam along the rod and also of the collar and spring may be effected by means of an adjustable thumb screw 66.

Mounted on trip lever 46 is a roller 67 adapted to contact with cam 63 when rod 50 has been sufficiently lowered by the downward stroke of the tramper head. A spring 68 having one end secured to trip lever 46 and the other end secured to bracket 45 acts to normally urge catch 47 into locking contact with the forked end 57 of bell crank lever 56. The function of the trip lever 46 and its catch 47 is to lock the operating lever 56 in either of two positions, one in which it throws the parts connected with rock shaft 62 in such manner as to continuously admit power to the upper end of the power cylinder during lowering movement of the tramper head, and the other in which said operating parts are thrown, so as to continuously admit power to the lower end of the power cylinder and effect an upward movement of the piston and connected tramper head. Secured to rack bar 21 is a spring 69 sensitive to pressure on a rake 1 exerted in a direction opposite from the movement of the rake toward the press box. Operatively connected with rake 1 is a finger or trip 70 which is adapted to be pushed outwardly from the rack bar 21 against the pressure of spring 69 by the pressure of the cotton on rake 1. Throwing of finger or trip 70 will be efficient to push trip 59 on rock shaft 60 from beneath vertical arm 58 of bell crank lever 56, and accordingly release said bell crank lever.

The operation of the automatic tripping device is as follows: When a sufficient quantity of cotton has been fed to a press box $f$, the accumulated pressure will be transmitted to a rake 1 in a manner to overcome the tendency of spring 69 to keep the rake in its normal position relatively to the rack bar 21, and thus, the pressure of the cotton projects finger 70. When finger 70 comes into contact with trip 59, the movement of the rake 1 pushes the trip from its engaging position beneath the vertical arm 58 of the operating lever 56. This releases the operating lever 56 and permits it to oscillate freely with its shaft 62. By reference to Fig. 5 of the drawing, it will be noted that before operating lever 56 is released, spring 53 is compressed beneath the forked end 57 of operating lever 56 and catch 47 of trip lever 46 is thrust against the forked end of the operating lever, holding it in the position shown. When the parts are so disposed, controlling valve 40 is partly open in a manner to permit a supply of fluid pressure through pipe 39 leading to the lower end of the power cylinder 36, in order to keep piston head 37 and tramper in elevated position. As soon as the operating lever 56 is released, the pressure of spring 53 is free to act on the forked end 57 of said lever, and the spring expanding, the operating lever 56 is thrown upwardly into the position shown in Fig. 6. This expansion of spring 53 and throwing of operating lever 56 oscillates rock shaft 62, and through suitable connections actuates the controlling valve 40 to bring port 41 into communication with pipe 38, and supply pipe 39 in communication with the atmosphere through exhaust port 44. At this instant fluid pressure enters the upper end of power cylinder 36, through supply pipe 38, and the pressure beneath piston head 37 will be exhausted through supply pipe 39 to the atmosphere; the fluid pressure above piston head 37 immediately starts the tramper on its downward stroke to tramp the accumulated cotton down into the press box $f$. Rocking of shaft 62 to actuate the controlling valve 40 will also operate a clutch or other suitable device to stop movement of the rakes 1 and 2, during lowering movement of the tramper head, and until it has reached its former elevated position. A preferred arrangement of connections between the controlling valve, power supply to the rakes, and said rock shaft 62, will be hereinafter more fully described. It will be noted that a rake, 1 for instance, stops its feeding movement at a point adjacent to the supply end of the press box $f$ and remains immovable in a position wherein the prongs lie in a plane nearly vertical. As a result, immediate cessation of the cotton feed to the press box is not only effected, but the rake also acts as a positive barrier against further discharge of cotton into the press box during lowering movement of the tramper. This is a distinct advantage in practice, since it not only renders unnecessary the provision of various supplementary contrivances for preventing discharge of cotton into the press box during lowering movement of the tramper head, but also permits a much more extensive sweep of the rake in its forward feeding movement. By allowing a rake to sweep under the tramper head, any tendency to over accumulation of cotton within the press box on the side adjacent the discharge end of the lint slide is reduced to a minimum, and a more equal distribution of cotton is consequently rendered possible. Heretofore, the supplementary contrivances for preventing discharge of cotton during lowering movement of the tramper have absolutely prevented a feeding member from entering the press box in the space below the tramper head, and, accordingly, have greatly limited the effective scope of a positive feed. When the bell crank lever 56 has been thrown into the position indicated in Fig. 6, it will be held by trip lever 46 throwing catch 47 beneath the forked end 57 of the bell crank lever. Thus the controlling valve 40 is maintained effective to continuously supply fluid pressure to the upper end of the power cylinder during lowering movement of the tramper head, and further feed of cotton is also prevented. It will be understood, of course, that the period of time during which the lowering movement of the tramper head occurs is comparatively short, and also that the action of spring 53 commences almost simultaneously with the accumulation of the proper quantity of cotton within the press box.

Figure 7:
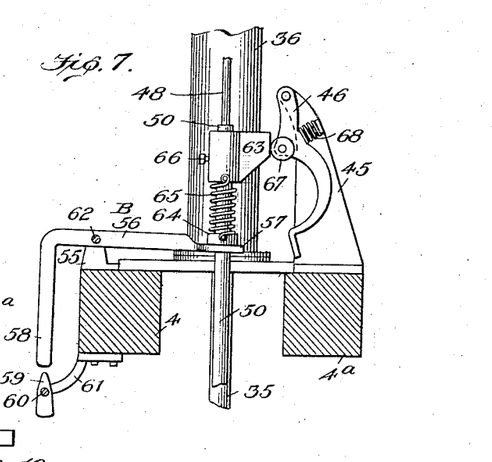
Fig. 7 is a view similar to Fig. 5, but showing the parts in the positions they assume when the tramper head is starting on its upward stroke.

When the tramper head and rod 50 have arrived at a sufficiently lowered position, collar 64 on said rod contacts with forked end 57 of bell crank lever 56, and throws said lever downwardly into the position shown in Fig. 7. During this operation spring 65 is compressed and acts as a buffer to prevent undue jarring of the parts due to the heavy weight of the tramper which is transmitted to lever 56 through rod 50 and collar 64. Before collar 64 has engaged the forked end of the bell crank lever, cam 63 has contacted with roller 67 to brush trip lever 46 out of the path of collar 64 and trip 47 from beneath forked end 57 of the bell crank lever, permitting said lever free movement by said collar 64. When moved to the position shown in Fig. 7, lever 57 has oscillated shaft 62 in such manner that controlling valve 40 shuts off fluid pressure to the upper end of power cylinder through the supply pipe and opens up this end of the cylinder to the atmosphere through the pipe connections above described; the valve 40, however, is actuated to open full way the port 42 in communication with supply pipe 39, and the fluid pressure supplied to the lower end of the cylinder immediately starts the tramper head on its upward return stroke. The feeding movement of the rake, however, will not be restored until the tramper head has arrived at its normal elevated position and collar 52 has again contacted with the forked end 57 of the bell crank lever 56. Spring 53 is then again placed under compression, ready to throw the lever to start the tramper head on its downward tramping stroke, when a sufficient quantity of cotton has accumulated in the press box. Port 42 will remain part way open to permit the escape of sufficient fluid pressure into the lower end of the power cylinder to maintain the tramper head in elevated position.

For the purpose of oscillating the valve body 43, rock shaft 62 is provided with a valve actuating lever 71 operating a link 701 connected to the lever 71 at 72 and to the valve body 43 at 73. The said lever 71 will be obedient to the oscillations of rock shaft 62 and through the medium of link 701 is effective to transmit the motion of operating lever 56 to the controlling valve, and effect operation of the tramper, as above described. Also connected to said rock shaft 62 is a clutch actuating lever 74, which is adapted to control a clutch 75 mounted on shaft $5^a$ and controlling the supply of power through pulley 8. It will be obvious the lever 74 is so arranged as to disconnect the clutch from the shaft $5^a$ when the tramper starts on its downward stroke, and immediately connect it, as soon as the return of the tramper occurs.

With the exception of the side adjacent to the discharge end of chute G, the space above press box $f$ will be inclosed by a screen 76. The screen 76 may be conveniently mounted on the press frame in such manner as to not present any interference with the swinging movements of the press boxes $f$, $f'$ on rotatable table $f^2$. The purpose of the screen is to prevent spilling and consequent wasting of the cotton during feed and tramping thereof.

A modified form of automatic tripping device is illustrated in Fig. 15. As shown therein, the operating lever 56, and trip lever 46, are mounted in reverse position with respect to the power cylinder. Instead of providing a rake-controlled trip 59 (Figs. 5 to 8, inclusive), the operating lever 56 may be released by a trip apron 77, pivoted at 78 to the press frame. The trip apron will be sensitive to the direct pressure of the cotton within the press box, and, when moved thereby so as to release lever 56, the automatic tripping devices become operative in precisely the same manner, as previously described.

*The improved controlling valve mechanism.*

The controlling valve mechanism and its modifications is illustrated in Figs. 9 to 12, inclusive.

Figure 10:
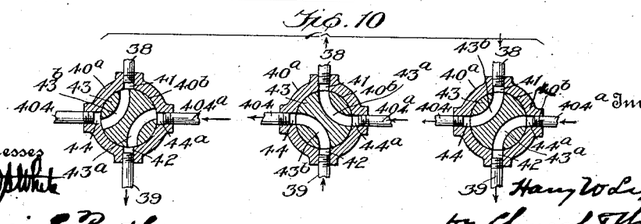
Fig. 10 is a detail view partly in section of the improved controlling valve mechanism.

In Figs. 9 and 10, the controlling valve 40 is actuated entirely by the operating lever 56 to effect lowering and upward movements of the tramper. As shown, valve 40 comprises a casing $40^a$ having four casing ports 41, 42, 44, $44^a$ respectively. Port 41 communicates with a supply pipe 38 extending to the top of the cylinder 36, and for the purpose of supplying steam above piston head 37 to effect lowering movement of the tramper head 34; port 42 communicates with a supply pipe 39 extending to the bottom of the cylinder 36 and for the purpose of supplying steam below piston head 37 to effect upward movement of the tramper head. Both ports 41, 42, and connected pipes 38, 39 also act to exhaust the pressure from the power cylinder 36. Port 44 is connected with an exhaust pipe 404, and port $44^a$ is connected with a steam supply pipe $404^a$. The valve casing $40^a$ confines a cylindrical valve chamber $40^b$, and rotatably mounted within said cylindrical chamber is a valve body 43 having by-passes $43^a$, $43^b$. Valve body 43 is provided with eccentric stud 73 to which is pivoted one end of a link 701; the other end of link 701 is pivoted to a lever 71 fixed to and obedient to the oscillations of rock shaft 62 (see Fig. 9). As shown in Fig. 10 the valve is in the position it assumes during cotton feed with by-pass $43^b$ partly in communication with ports 41 and 44; by-pass $43^a$ is also partly in communication with ports $44^a$ and 42. With the ports and by-passes so disposed, the upper end of power cylinder 36 is partly open to the atmosphere through pipe 38, port 41, by-pass $43^b$, port 44 and exhaust pipe 404, thus exhausting the fluid pressure from the top of the cylinder; at the same time, enough steam is being supplied to the lower end of the cylinder to keep piston head 37, and tramper head 34 elevated, the said supply being through supply pipe $404^a$, port $44^a$, by-pass $43^a$, port 42 and pipe 39. When, however, the automatic tripping device becomes active in the manner previously described, operating lever 56 will be thrown upwardly, thus rocking shaft 62. The result of this is that lever 71 and link 701 rotate valve body 43 through an arc sufficient to connect ports $44^a$ and 41 through by-pass $43^a$ and simultaneously connect ports 42 and 44 through by-pass $43^b$, the said ports being brought into full registration at this time. Accordingly, it will be seen that supply pipe 38 is in communication with pipe $404^a$, thus admitting steam to the upper end of power cylinder 36 and starting piston head 37 and the connected parts on their downward movement. The fluid pressure in the power cylinder beneath the piston head will be exhausted through pipe 39, which, at this period, is in communication with exhaust pipe 40⁴. When the piston and tramper have reached the limit of their downward stroke, the automatic tripping device operates to reverse lever 71 and link 701 and consequently valve body 43. Upon said reversal, by-pass 43ᵃ will be in full registration with ports 44ᵃ and 42, thus opening up the lower end of the power cylinder to supply pipe 404ᵃ through pipe 39 and starting piston head 37 on its upward stroke; pipe 38 is open to the atmosphere through port 41, by-pass 43ᵇ, port 44 and exhaust pipe 40⁴. The valve body 43 is returned to its normal position to admit a sufficient supply of steam to keep the piston head 37 elevated, by the automatic tripping device and the connections on rack shaft 62 when the tramper head has reached the limit of its upward stroke. It is desirable to keep the lower end of the cylinder part-way open to the steam supply, in order to positively prevent any danger of the tramper falling into the press box during cotton feed, as this would almost certainly result in serious damage to the entire apparatus.

Figures 11, 11A, 12:
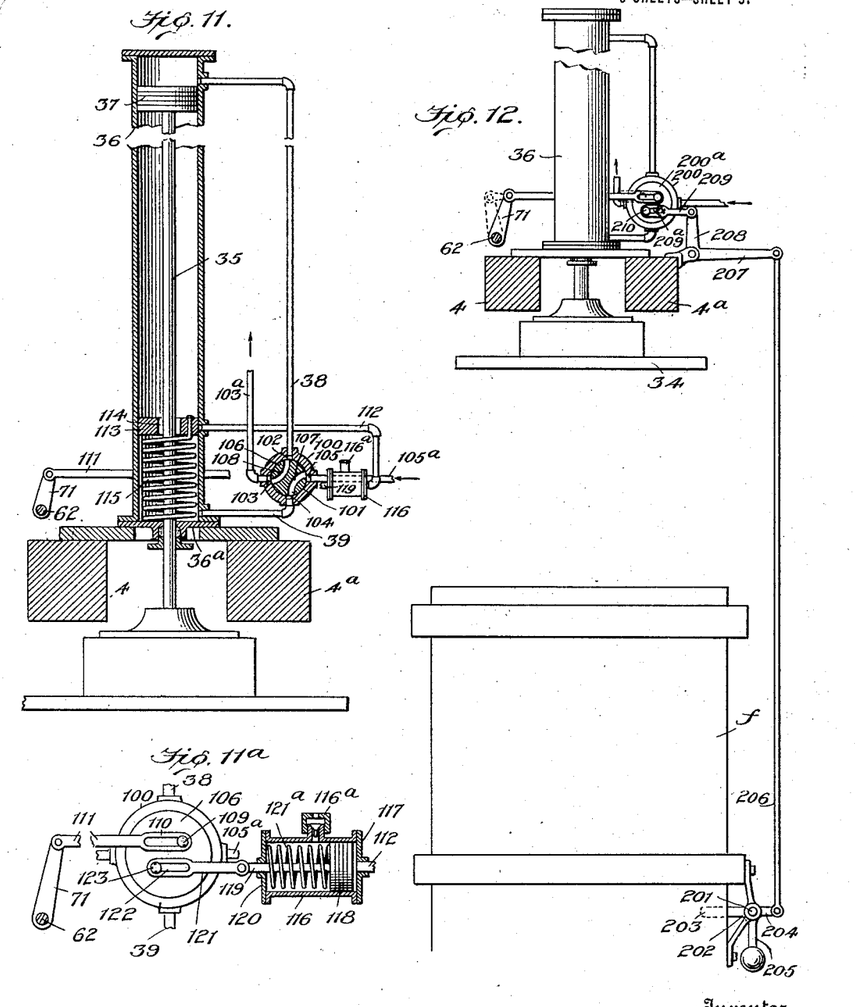

In the arrangement shown in Figs. 11 and 11ᵃ, the controlling valve is actuated by the steam pressure within the power cylinder to effect upward movement of the tramper head when it has reached a predetermined lowered position in the press box. The valve casing 100 is provided with a cylindrical valve chamber 101 and casing ports 102, 103, 104, 105. Port 102 is in communication with supply pipe 38 for supplying steam to the upper end of the power cylinder 36; port 103 in communication with an exhaust pipe 103ᵃ; port 104 in communication with a pipe 39 for supplying steam to the lower end of the power cylinder; port 105 in communication with a main steam supply pipe 105ᵃ. The rotary valve body 106 is mounted within the valve chamber 101 and is provided with by-passes 107, 108. As shown in Fig. 11, the valve body is in the relation with respect to the several ports which it assumes when the piston head 37 and tramper 34 are in normal elevated position, i. e. during feed of the cotton into the press box. In such position, by-pass 107 is in part-registration with ports 105, 104, thus admitting sufficient steeam from pipe 105ᵃ and through cylinder supply pipe 39 to the lower end of the cylinder to keep the piston head 37 elevated.

The valve body 106 will be actuated by the automatic tripping device to effect lowering movement of the piston head and tamper. For this purpose, valve body 106 is provided with an eccentric stud 109, which passes through a slot 110 in one end of a link 111 pivoted at its other end to lever 71 fixed on rock shaft 62. Shaft 62 is rocked by operating lever 56 of the automatic trip device, and when said operating lever 56 is thrown in a manner previously described, lever 71 and link 111 will rotate valve body 106 through an arc sufficient to bring by-pass 108 into full registration with casing ports 105, 102, and by-pass 107 into full registration with casing ports 104, 103. This opens up the upper end of the power cylinder to the supply and the lower end thereof to the atmosphere, whereupon lowering movement of the piston head 37 immediately commences. By reason of slot 110 in link 111, the automatic tripping device is effective to rotate the valve body in one direction only, i. e. to effect lowering movement of the tramper head.

The reversal of the valve is accomplished by the following mechanism:—At some point within the power cylinder near the lower end thereof, but above supply pipe opening 39, an exhaust pipe 112 communicates with the interior of the power cylinder. Normally closing said exhaust pipe 112 is a valve, preferably a sleeve 113 located within the cylinder and having a central opening 114 greater in diameter than the piston rod 35, so as not to interfere with the movements of the piston rod and also permit the escape of steam past the sleeve. Interposed between said sleeve 113 and the lower cylinder head 36ᵃ is a coil spring 115 preferably having both its ends securely fastened to the sleeve and cylinder head respectively. The coil spring 115 is normally efficient to exert its pressure on sleeve 113 in such manner that the said sleeve covers the exhaust opening 112, and thereby prevents escape or leakage of steam, except at the desired interval. Exhaust pipe 112 communicates with the supplementary closed cylinder 116 through the head end 117 thereof. Mounted within said cylinder 116 is a piston head 118 on the end of a piston rod 119 extending through an opening in the rear end 120 of the cylinder. At a point adjacent the rear end of cylinder 116, a check valve 116ᵃ is provided, for the purpose of exhausting fluid pressure supplied by exhaust pipe 112. The piston 118 is normally urged toward the point where the pipe 112 communicates with the cylinder 116 by a coil spring 121 encircling piston rod 119 behind the rear face of the piston head 118. Pivoted to the free end of piston rod 119 is a link 121 having a slot 122, through which passes a stud 123 eccentrically mounted on the valve body 106. The function of the link 121 is to rotate the valve body 106 in reverse direction from that effected by link 111, i. e., from a position in which steam is supplied to the upper end of the cylinder, to a position in which the steam is exhausted from the upper end of the cylinder and the supply is to the lower end of the cylinder to effect upward movement of the piston head 37 and connected tramper.

The operation of this form of controlling valve mechanism is as follows:—It will be assumed that steam is being supplied to the upper end of power cylinder 36, and piston head 37 is making its downward stroke. Accordingly, piston head 37, at nearly the end of its stroke, will strike sleeve 113 compressing against it spring 115, and, at the end of the piston stroke, sleeve 113 and piston 37 will have moved downwardly sufficiently to uncover exhaust pipe 112, which is thereupon placed in communication with that portion of cylinder 36, now above piston head 37. The fluid pressure will immediately pass through said exhaust pipe 112 into supplementary cylinder 116, and piston head 118 will be imparted a single impulse until check valve 116ª is uncovered by the moving piston head 118, whereupon the fluid pressure within the supplementary cylinder will be exhausted to the atmosphere. The result of the impulse imparted to piston head 118 is that link 121 will be thrown, and through its engagement with stud 123, valve body 106 will be rotated through an arc sufficient to reverse the registration of the valve body ports with the casing ports. When reversed in this manner, valve body port 107 will be in full registration with casing ports 105, 104, and valve body port 108 in full registration with valve body ports 102, 103. Accordingly, the fluid pressure above piston head 37 is exhausted through pipes 38 and 103ª, and the supply is through pipes 105ª and 39, so that the piston head 37 and connected tramper head 34 is immediately started on its upward return stroke. The piston head 118 in supplementary cylinder 116 will be returned by spring 119, link 121 sliding freely over stud 123 by reason of slot 122. When piston head 37 in main cylinder 36 has been sufficiently elevated, spring 115 will return sleeve 113 to its normal position covering exhaust pipe 112, and preventing escape of fluid pressure from the power cylinder. The automatic tripping device will, through lever 71 impart a slight rotation to valve body 106, sufficient to leave ports 105, 104 in part registration with by-pass 107, and continue the supply of steam beneath the piston head 37 and keep it elevated during feed of the cotton.

A further modified form of controlling valve mechanism is illustrated in Fig. 12.

Inasmuch as the valve 200 is precisely the same as the valve shown in connection with the arrangement shown in Figs. 11 and 11ª, a detail description of its operation will not be given here. The automatic tripping device, also, actuates the said valve in precisely the same manner to effect lowering movement of the tramper head. A different arrangement, however, is shown for reversing the valve to effect a return of the tramper head to elevated position, when a predetermined lowered position of the head in the press box has been reached.

Pivoted at 201 to the press box $f$ is a dog 202 having an arm 203 extending within the press, and an exterior arm 204. The dog 202 is also provided with a depending weighted arm 205 which is effective to keep arms 203, 204 normally in a horizontal plane with respect to the press box $f$. A connecting rod 206 is pivotally connected at its lower end to exterior arm 204 of dog 202, and is pivotally connected at its upper end to one arm 207 of a bell crank lever. The other arm 208 of the bell crank lever is pivoted at its end to a link 209 having slot 209ª embracing a stud 210 eccentrically mounted on valve body 200ª.

When tramper head 34 during its downward stroke strikes arm 203 of dog 202, connecting rod 206 is given an upward thrust which actuates the bell crank lever and link 209 in a manner to rotate the valve sufficiently to bring the ports into registration for supplying steam to the lower end of the power cylinder. The dog 202 and connected parts will be returned to their normal position by weighted arm 205, during which return movement stud 210 slides in slot 209ª of link 209, since the position of the valve will not be changed until the tramper head is fully elevated.

*The improved arrangement for determining the weight of the cotton tramped in the press.*

Figure 13B:
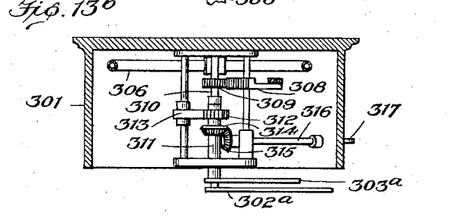

This feature of the invention is illustrated in Figs. 13, 13ª and 13ᵇ. The purpose is to provide means for accurately registering the number of pounds of cotton tramped during repeated tramping strokes of the press, in order that the operator may be informed at all times as to the exact quantity of cotton within the press. In this way, a much more careful measurement of the completed bales is attained, which heretofore have been subject to wide variations in size and weight, because of the fact that all prior arrangements leave computing of the weight of the bales to the guesswork of the operator. In the present improved weight computing device, advantage is taken of the fact that the amount of pressure to effect tramping must be increased proportionately to the amount of cotton within the press box. In other words, as the press box fills up, the number of pounds of pressure on the tramping plunger increases constantly as the tramping action continues until a required quantity of cotton has been tramped for converting into a bale. Referring now to the following description:

Connected with the interior of the power cylinder 36 is a gage pipe 300 which is provided with a pressure gage 301. The pressure gage is provided with two dials 302, 303, and two hands $302^a$, $303^a$, respectively. Dial 302 is provided with characters indicating the number of pounds steam pressure within the power cylinder, depending upon the position of hand $302^a$. The position of hand $303^a$ will indicate the number of pounds of cotton within the press, on dial 303. Hand $302^a$ will fluctuate back and forth in response to variations in pressure within the cylinder 36; hand $303^a$ is capable of being advanced only by hand $302^a$, and will remain in such advanced position on the dial until an increase of pressure within the power cylinder moves hand $302^a$ past the previous position of hand $303^a$.

Perhaps the following example will serve to better illustrate the principle of operation. Assuming that a given quantity, say 50 pounds, of cotton has been fed into, but not yet tramped in the press box, and that it would take 10,000 pounds steam pressure on the tramper plunger to tramp the 50 pounds of cotton. When the plunger descends the hand $302^a$ will register 10,000 pounds pressure on the dial 302 and hand $303^a$ will register 50 pounds cotton on dial 303. Now, if the amount of cotton to be tramped is more than 50 pounds, or an excess quantity $x$, for instance, it would require an excess of pressure $y$ to tramp the entire quantity of cotton. The total pressure 10,000 pounds plus $y$ pounds would be indicated on the dial, and also the total pounds of cotton $50+x$ would be indicated, since increase of pressure $x$ is proportionate to increase in pounds $y$ of cotton. By arranging hand $303^a$ so as to be capable of indicating movement in one direction only the total number of pounds of cotton within the press will be registered as the tramping action proceeds.

When the desired quantity has been obtained within the press box $f$, the operator may be notified of the fact by a whistle or other alarm 304. This whistle 304 is mounted on a branch pipe $300^a$ and having a check valve 305 which opens to the whistle, when a predetermined maximum of fluid pressure within the gage 301 is reached.

A preferred form of pressure gage is illustrated in Figs. $13^a$ and $13^b$. In connection with gage pipe 300 is a Bourdon tube 306, having a lever mechanism 307 which actuates a segmental rack 308, as the Bourdon tube expands or contracts. The teeth of the segmental rack are in mesh with a pinion 309 fixed to a shaft 310 on which is mounted hand $302^a$. Hand $303^a$ is mounted on a sleeve 311 rotatable with shaft 310 in one direction, but non-rotatable in the opposite direction. For this purpose sleeve 311 is provided with a ratchet 312, the teeth of which are adapted to be engaged by a pawl 313. Mounted on sleeve 311 is a bevel pinion 314 in mesh with a bevel pinion 315 on a shaft 316 projecting beyond the gage casing, as shown. Shaft 316 may be provided with a key 317 for rotating hand $303^a$ to zero position on the dial, when an empty press box has been swung into position beneath the tramper. During resetting of hand $303^a$ sleeve 311 turns on shaft 310.

In Fig. 14 is illustrated a mechanically operated alarm for notifying the operator when a sufficient quantity of cotton has been tramped for baling. The tramper press shown therein is of the weight-return type, having weights 350, 351, mounted on the ends of ropes 352, 353, respectively. Said ropes 352, 353 pass over pulleys 354, 355 mounted on the press frame and are attached to tramper head 34 for returning it to elevated position. Mounted on the tramper head 34 is a bell 356 of any suitable construction. The inner face of tramper head 34 is provided with a movable press board 357 mounted on rods 358 and 359 passing through the tramper head. Springs 360, 361 encircling rods 358, 359, respectively hold the press board normally in spaced relation with respect to the tramper head. One of the rods, such as 358, may be provided with a trip or catch 362, which is in normal engagement with a spring actuated bell clapper 363, and acts to prevent said bell clapper from ringing the bell. When, however, the quantity of cotton within the press box is sufficiently great, the increased resistance to the tramping stroke of head 34 will cause the tension of springs 360, 361 to be overcome, and, accordingly, press board 357 will be compressed against the inner face of tramper head 34. This moves rods 358, releasing bell clapper 363 which immediately rings the bell 356, and notifies the operator that a sufficient quantity of cotton has been tramped for baling.

What is claimed is:

1. In an apparatus such as described, the combination of a tramper press, a feeding instrumentality for positively delivering material to the press box, trip mechanism controlling the operation of the tramper press and also the operation of the feeding instrumentality, said trip mechanism adapted when released to effect the operation of the tramper press and simultaneously stop the operation of the feeding instrumentality, and means controlled by the feeding instrumentality for normally preventing operation of the trip mechanism.

2. In an apparatus such as described, the combination of a tramper press operative upon filling of the press box, a feeding instrumentality for positively delivering material to the press box, and means directly responsive to the accumulation of a predetermined pressure on the feeding instrumentality and acting as a single unit for stopping the feed of the material and simultaneously effecting the operation of the tramper press.

3. In an apparatus, such as described, the combination of a tramper press, a movable feeding member, a support on which said member is pivotally mounted and normally held by yielding pressure in fixed position relatively to the support, means for moving the support and feeding member in unison to positively deliver material to the press box, and means responsive to displacement of said feeding member relatively to its support for effecting the operation of the tramper press.

4. In an apparatus such as described, the combination of a tramper press, a movable feeding member, a support on which said member is pivotally mounted and normally held by yielding pressure in fixed position relatively to the support, means for moving the support and feeding member in unison to positively deliver material to the press box, and means responsive to displacement of said feeding member relatively to its support for effecting the operation of the tramper press and simultaneously stopping the feed of the material.

5. In an apparatus such as described, the combination of a tramper press, a feeding instrumentality including, a movable feeding member, a support on which said member is pivotally mounted and normally held by yielding pressure in fixed position relatively to the support, and means for moving the support and feeding member in unison to positively deliver material to the press box; and means responsive to displacement of said feeding member relatively to its support for effecting the operation of the tramper press and simultaneously stopping the operation of the feeding instrumentality.

6. In an apparatus for handling cotton and the like, the combination of a press box, a plunger, and means for supplying power to the plunger to effect lowering and upward movement thereof, a feeding element which delivers cotton to the press box, an operating element controlling the supply of power to the plunger, and operable upon release by the feeding element when a predetermined amount of cotton has accumulated within the press box, a spring-pressed member carried by the plunger for throwing said operating element to a position to supply power to the plunger, and effect lowering movement therof, upon a release of the operating element, and a spring-pressed member carried by the plunger for throwing said operating element to a position to reverse the supply of power to the plunger and effect upward movement thereof when the plunger has reached a predetermined lowered position in the press box.

7. In an apparatus for handling cotton and the like, the combination of a press box, a plunger and means for supplying power to the plunger to effect lowering and upward movement thereof, an operating element controlling the supply of power to the plunger and also directly controlling the feed of the cotton and adapted to be released upon the accumulation of a predetermined amount of cotton within the press box, means for throwing said operating element to a position to supply power to the plunger and effect lowering movement thereof upon its release, and also stop the feed of cotton, and means for throwing said operating element to a position to reverse the supply of power to the plunger and effect upward movement thereof when the plunger has reached a predetermined lowered position.

8. In an apparatus for handling cotton and the like, the combination of a press box, a plunger and means for supplying power to the plunger to effect lowering and upward movement thereof, an operating element controlling the supply of power to the plunger and also directly controlling the feed of the cotton to the press box, said operating element being adapted to be released upon the accumulation of a predetermined amount of cotton within the press box, means for causing said operating element to supply power to the plunger in a manner to effect lowering movement thereof upon its release and simultaneously stop the feed of the cotton, means for throwing said operating element to a position to reverse the supply of power to the plunger and effect upward movement thereof when the plunger has reached a predetermined lowered position, and means for actuating said operating element to permit a resumption of the cotton feed when the plunger has reached its former elevated position.

9. In an apparatus for handling cotton and the like, the combination of a press box, a plunger, and means for supplying power to the plunger to effect lowering and upward movement thereof, an operating element controlling the supply of power to the plunger and also directly controlling the feed of the cotton to the press box, said operating element being adapted to be released upon the accumulation of a predetermined amount of cotton within the press box, means for causing said operating element to supply power to the plunger in a manner to effect lowering movement thereof upon its release and simultaneously stop the feed of the cotton, and adjustable means for throwing said operating element to a position to reverse the supply of power to the plunger and effect upward movement thereof when the plunger has reached a predetermined lowered position, and also for actuating said operating element to permit a resumption of the cotton feed when the plunger has reached its former elevated position.

10. In an apparatus for handling cotton and the like, the combination of a press box, a plunger, and means for supplying power to the plunger to effect lowering and upward movement thereof, a rod carried by said plunger and movable therewith, an operating element controlling the supply of power to the plunger and also the feed of the cotton, said operating element being adapted to be released upon the accumulation of a predetermined amount of cotton within the press box, a spring carried by said rod for throwing the operating element to a position to supply power to the plunger and effect lowering movement thereof upon its release, said operating element when thrown acting to simultaneously stop the feed of cotton, a second spring mounted on said rod and engageable with the operating element when the plunger has reached a predetermined lowered position in the press box, said second spring acting to throw the operating element to a position to reverse the supply of power to the plunger and effect upward movement thereof, and means for restoring the feed of the cotton when the plunger has reached its former elevated position.

11. In an apparatus for handling cotton and the like, the combination of a press box, a plunger and means for supplying power to the plunger to effect lowering and upward movement thereof, a rod carried by said plunger and movable therewith, an operating element controlling the supply of power to the plunger and also the feed of the cotton, said operating element being adapted to be released upon the accumulation of a predetermined amount of cotton within the press box, an adjustable spring carried by said rod for throwing the operating element to a position to supply power to the plunger and effect lowering movement thereof upon its release, said operating element when thrown acting to simultaneously stop the feed of cotton, a second adjustable spring mounted on said rod and engageable with the operating element when the plunger has reached a predetermined lowered position, said second spring acting to throw the operating element to a position to reverse the supply of power to the plunger and effect upward movement thereof, and means for restoring the feed of the cotton when the plunger has reached its former elevated position.

12. In a cotton feeding device, the combination of a support on which the cotton is progressed, and feeding means engageable with the cotton in a manner to direct the cotton in a path diverse from its normal direction of progression on said support.

13. In a cotton feeding device, the combination of a support on which the cotton is progressed, and feeding means therefor including a plurality of feeding members, each engageable with the cotton in a manner to direct it in a path diverse from its normal direction of progression on said support.

14. In a cotton feeding device, the combination of a support on which the cotton is progressed, and feeding means therefor including a plurality of feeding members movable in directions diverse with respect to the normal direction of progression of the cotton on said support, the directions of movement of the several feeding members being also diverse with respect to each other.

15. In a cotton feeding device, the combination of a support on which the cotton is progressed and also arranged to impart a gravital flow to the cotton, and feeding means therefor including a plurality of independently mounted feeding members alternately engageable with the cotton and movable in directions diverse with respect to the direction of normal gravital flow, the directions of movement of the several feeding members being also diverse with respect to each other.

16. In a cotton feeding device, the combination of a support on which the cotton is progressed, and feeding means therefor including a pair of independently mounted feeding members alternately engageable with the cotton and movable in directions diverse to the direction of progression of the cotton on said support.

17. In a cotton feeding device, the combination of a support on which the cotton is progressed, and feeding means therefor including a pair of independently mounted feeding members alternately engageable with the cotton and movable in directions diverse with respect to the direction of progression of the cotton, the directions of movement of the two feeding members being also diverse with respect to each other.

18. In a cotton feeding device, the combination of a support on which the cotton is progressed, and positive feeding means therefor movable angularly across the support.

19. In a cotton feeding device, the combination of a support on which the cotton is progressed, and positive feeding means therefor including a plurality of feeding members movable angularly across the support, and alternately engageable with the cotton.

20. In cotton tramping apparatus, the combination of a press box, a power cylinder, a plunger adapted to be actuated by fluid pressure supplied to the power cylinder, a valve for controlling the fluid pressure supply, mechanical connections for actuating said valve to supply fluid pressure to the power cylinder in a manner to effect lowering movement of the plunger, and means controlled by the fluid pressure within the power cylinder for actuating said valve to reverse the fluid pressure supply and effect upward movement of the plunger when it has reached a predetermined lowered position in the press box.

21. In cotton tramping apparatus, the combination of a press box, a power cylinder, a plunger adapted to be actuated by fluid pressure supplied to the power cylinder, a valve for controlling the fluid pressure supply, mechanical connections for actuating said valve to supply fluid pressure to the power cylinder in a manner to effect lowering movement of the plunger, and fluid pressure actuated connections for actuating said valve to reverse the fluid pressure supply and effect upward movement of the plunger when it has reached a predetermined lowered position in the press box.

22. In cotton tramping apparatus, the combination of a press box, a power cylinder, a plunger adapted to be actuated by fluid pressure supplied to the power cylinder, means for feeding cotton to the press box, a valve for controlling the fluid pressure supply, mechanical connections responsive to the accumulation of a predetermined amount of cotton within the press box for actuating said valve to supply fluid pressure to the power cylinder in a manner to effect lowering movement of the plunger and tramp the cotton down into the press box, and means controlled by the fluid pressure within the power cylinder for actuating said valve to reverse the fluid pressure supply and effect upward movement of the plunger when it has reached a predetermined lowered position in the press box.

23. In cotton tramping apparatus, the combination of a press box, a power cylinder, a plunger adapted to be actuated by fluid pressure supplied to the power cylinder, a feeding element for delivering cotton to the press box, a valve for controlling the fluid pressure supply, means controlled by the feed of cotton for actuating said valve to supply fluid pressure to the power cylinder in a manner to effect lowering movement of the plunger and tramp the cotton down into the press box, and means controlled by the fluid pressure within the power cylinder for actuating said valve to reverse the fluid pressure supply and effect upward movement of the plunger when it has reached a predetermined lowered position in the press box.

24. In cotton tramping apparatus, the combination of a press box, a power cylinder, a plunger adapted to be actuated by fluid pressure supplied to the power cylinder, a valve for controlling the fluid pressure supply, means for actuating said valve to supply fluid pressure to the power cylinder in a manner to effect lowering movement of the plunger, and means for reversing said valve to reverse the fluid pressure supply and effect upward movement of the plunger, including an independent valve actuating element responsive to fluid pressure within the power cylinder when the plunger has reached a predetermined lowered position in the press box.

25. In cotton tramping apparatus, the combination of a press box, a power cylinder, a plunger adapted to be actuated by fluid pressure supplied to the power cylinder, a valve for controlling the fluid pressure supply, means for actuating said valve to supply fluid pressure to the power cylinder in a manner to effect lowering movement of the plunger, and means for reversing said valve to reverse the fluid pressure supply and effect upward movement of the plunger, including a valve actuating element connected with the controlling valve adapted to be actuated by fluid pressure, and valve controlled mechanism for supplying fluid pressure from the power cylinder to said element when the plunger has reached a predetermined lowered position in the press box.

26. An apparatus for tramping cotton and the like comprising a power cylinder, a press box, a piston movable in the power cylinder and having a tramper head, a valve controlling the delivery of operating fluid to said power cylinder, valve operating mechanism, feeding mechanism, a shaft positively connecting said mechanisms, a lever rigid on said shaft and fulcrumed thereby, a spring pressing one end of said lever, and adapted when released to move the shaft to valve opening and feed disconnecting position, a trip engageable with the other end of said lever to hold said spring compressed, and means for intermittently moving said trip out of engagement with the valve operating element thereby releasing the spring.

27. An apparatus for tramping cotton and the like, comprising a power cylinder, a press box, a piston movable in the power cylinder and having a tramper head, a valve controlling the delivery of operating fluid to said power cylinder, valve operating mechanism, feeding mechanism, a shaft positively connecting said mechanisms, a lever rigid on said shaft and fulcrumed thereby, a spring pressing one end of said lever, and adapted when released to move the shaft to valve opening and feed disconnecting position, a trip engageable with the other end of said lever to hold said spring compressed, and means operated by pressure of material fed to the press box for moving said trip out of engagement with the valve operating element and thereby releasing said spring.

28. An apparatus for tramping cotton and the like, comprising a power cylinder, a press box, a piston movable in the power cylinder and having a tramper head, a valve controlling the delivery of operating fluid to said power cylinder, valve operating mechanism, feeding mechanism, a shaft positively connecting said mechanisms, a lever rigid on said shaft and fulcrumed thereby, a spring pressing one end of said lever, and adapted when released to move the shaft to valve opening and feed disconnecting position, a trip engageable with the other end of said lever to hold said spring compressed, a feeding element, and means operated by the pressure of material fed to the press box for establishing a direct connection between the feeding element and the trip, whereby movement of the feeding element will move the trip out of engagement with the valve operating element and thereby release said spring.

29. An apparatus for tramping cotton and the like, comprising a power cylinder, a press box, a piston movable up and down in the power cylinder and having a tramper head, a valve for delivering operating fluid to the upper and lower ends of the power cylinder, valve operating mechanism, feeding mechanism, a shaft positively connecting said mechanisms, a lever rigid on said shaft and fulcrumed thereby, a spring pressing one end of said lever, and adapted when released to move the shaft to valve opening and feed disconnecting position, a trip engageable with the other end of said lever to hold said spring compressed, means for intermittently moving said trip out of engagement with the valve operating element, thereby releasing said spring, and means movable with the tramper head for moving the operating element into position to actuate the valve to deliver operating fluid to the lower end of the power cylinder.

30. An apparatus for tramping cotton and the like, comprising a power cylinder, a press box, a piston movable up and down in the power cylinder and having a tramper head, a valve for delivering operating fluid to the upper and lower ends of the power cylinder, valve operating mechanism, feeding mechanism, a shaft positively connecting said mechanisms, a lever rigid on said shaft and fulcrumed thereby, a spring pressing one end of said lever, and adapted when released to move the shaft to valve opening and feed disconnecting position, a trip engageable with the other end of said lever to hold said spring compressed, means for intermittently moving said trip out of engagement with the valve operating element, thereby releasing said spring, a spring actuated member for retaining the operating element in position to effect the delivery of fluid to the upper end of the power cylinder, and means movable with the tramper head for moving the operating element into position to actuate the valve to deliver operating fluid to the lower end of the power cylinder and for restoring said spring actuated member to its normal position.

HARRY W. LIGON.

Witnesses:
R. A. THOMPSON,
R. F. BOWLER.